United States Patent
Runo et al.

(10) Patent No.: US 8,332,284 B1
(45) Date of Patent: Dec. 11, 2012

(54) PROVIDING MULTIPLE VIEWS FOR AN ITEM

(75) Inventors: Matthew Stephen Runo, Henderson, NV (US); Geoff D. Berger, Henderson, NV (US); Sotheavy Ouk, Las Vegas, NV (US)

(73) Assignee: Zappos IP, Inc., Henderson, NV (US)

( * ) Notice: Subject to any disclaimer, the term of this patent is extended or adjusted under 35 U.S.C. 154(b) by 7 days.

(21) Appl. No.: 12/851,638

(22) Filed: Aug. 6, 2010

(51) Int. Cl.
G06Q 30/00 (2006.01)

(52) U.S. Cl. .................................................. 705/27.2

(58) Field of Classification Search ............... 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 5,890,138 A * | 3/1999 | Godin et al. ................. | 705/26.3 |
| 7,114,131 B1 * | 9/2006 | Ballantine ..................... | 715/851 |
| 7,246,085 B2 * | 7/2007 | Kamon et al. ................ | 705/27.2 |
| 7,353,192 B1 * | 4/2008 | Ellis et al. ..................... | 705/26.5 |
| 2005/0171865 A1 * | 8/2005 | Beardow ......................... | 705/27 |
| 2008/0030516 A1 * | 2/2008 | Haghighi et al. ............. | 345/581 |
| 2009/0259935 A1 * | 10/2009 | Kramer et al. ................ | 715/234 |
| 2012/0179520 A1 * | 7/2012 | Vailaya et al. ............... | 705/14.4 |

OTHER PUBLICATIONS

Shuo Wang et al. "Designing a Generalized 3D Carousel View", CHI 2005, Apr. 2-7, 2005, Portland, Oregon, USA. ACM 1-59593-002-7/05/0004.*
Apple, Inc., Get to Know iPhoto, http://www.apple.com/ilife/iphoto/, retrieved May 13, 2010.

* cited by examiner

Primary Examiner — Naeem Haq
(74) Attorney, Agent, or Firm — Thomas |Horstemeyer, LLP (57) ABSTRACT

Disclosed are various embodiments for providing multiple views for an item in a network page. A network page that describes an item is generated in one or more computing devices. The network page includes an image rendering area for rendering a first one of a plurality of images associated with the item. The image rendering area is divided into a plurality of regions. Each of the images is mapped to a respective one of the regions. The network page includes code that replaces the first one of the images with a second one of the images when a cursor hovers over the respective one of the regions that is mapped to the second one of the images.

25 Claims, 9 Drawing Sheets

PROVIDING MULTIPLE VIEWS FOR AN ITEM

BACKGROUND

Customers of an online merchant may make a decision whether to purchase a particular product based on an image of the product. For example, a customer may search for a type of product and be presented with many search results. Each of the search results may be accompanied by an image of the product. The customer may decide to click through to a detail network page about the product and/or order the product based on the image that is presented.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing multiple views for an item. As used herein, the term "item" may refer to any good, product, service, software item, multimedia item, or other item that may be offered for sale, purchase, rental, lease, download, and/or any other form of consumption as may be appreciated. In various embodiments of the present disclosure, a network page describing one or more items is generated. Each of the descriptions of the items may be accompanied by an image rendering area where one image associated with the item is initially rendered. The image rendering area may be divided into multiple regions, where each region is mapped to one of multiple images of an item. When a user hovers a cursor over one of the regions on the image rendering area, another image associated with the item and mapped to that region may be rendered in the image rendering area. This different image thereby replaces the image associated with the item that was rendered previously in the image rendering area. In the following discussion, a general description of the system and its components is provided, followed by a discussion of the operation of the same.

Figure 1:
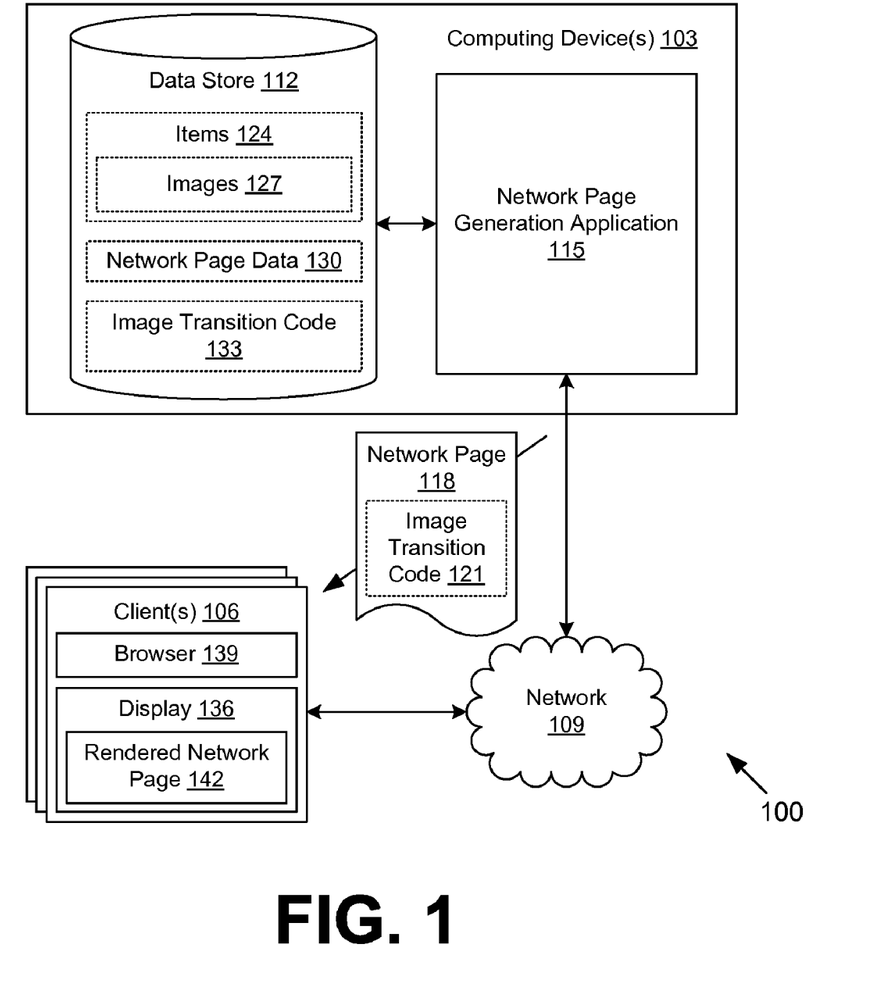
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a network page generation application 115 and other applications, services, processes, systems, engines, or functionality not discussed in detail herein. The network page generation application 115 is executed to generate network pages 118 that describe items and include image transition code 121 for facilitating the rendering of multiple views for an item within a single image rendering area associated with the item. The network page generation application 115 may include a network page server and/or other components. The network page server may comprise a commercially available hypertext transfer protocol (HTTP) server such as, for example, Apache® HTTP Server, Microsoft® Internet Information Services (IIS), and other servers.

The data stored in the data store 112 includes, for example, items 124, images 127, network page data 130, image transition code 133, and potentially other data. The items 124 may include any data relating to items 124 that are offered for sale, rental, lease, download, and/or any other form of consumption through a network site. The items 124 may include data such as titles, descriptions, keywords, metadata, weights, customer reviews, multimedia, and other data relating to the items 124. Images 127 may be associated with the items 124. The images 127 may include a plurality of images 127 related to each of the items 124. For example, the images 127 may depict multiple views, angles, versions, options, colors, features, accessories, and any other type of images 127 that may be associated with items 124.

The network page data 130 may include any type of data related to the generation of network pages 118. Such data may include, for example, templates, executable code, interpreted code, hypertext markup language (HTML), extensible markup language (XML), images, video, text, graphics, and any other type of data that may be used in generating network pages 118. The image transition code 133 includes code that facilities the transition from one image 127 to another image 127 within one or more image rendering areas in a network page 118. The network page generation application 115 may be configured to generate the image transition code 121 for a specific network page 118 and/or client 106 based on the image transition code 133 stored in the data store 112. The image transition code 121, 133 may include, for example, Javascript, dynamic HTML (DHTML), Ajax, and any other type of code that may be executed in a client 106 from within a network page 118.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 106 may also include a display 136. The display 136 may comprise, for example, one or more devices such as cathode ray tubes (CRTs), liquid crystal display (LCD) screens, gas plasma-based flat panel displays, LCD Projectors, or other types of display devices, etc.

The client 106 may be configured to execute various applications such as a browser 139 and/or other applications. The browser 139 may be executed in a client 106, for example, to access and render network pages 118, such as web pages or other network content served up by the computing device 103 and/or other servers, thereby generating a rendered network page 142 on the display 136. The client 106 may be configured to execute applications beyond the browser 139 such as, for example, email applications, instant message applications, and/or other applications.

Next, a general description of the operation of the various components of the networked environment 100 is provided. To begin, a user at a client 106 requests a network page 118 over the network 109 from the network page generation application 115. The requested network page 118 may be a search result network page 118, a gateway network page 118, a category network page 118, a detail network page 118, or another type of network page 118. The network page generation application 115 generates the network page 118, which includes the image transition code 121 and describes one or more items 124. In one embodiment, the network page generation application 115 may be configured to generate the image transition code 121 that is included in the network page 118 from the stored image transition code 133 in the data store 112. The network page 118 is rendered in the client 106 as the rendered network page 142.

An image rendering area may be provided in the rendered network page 142 adjacent to each respective description of the items 124. The term "adjacent" may refer to an image rendering area being proximate to the description of an item 124 so as to promote a visual association of the image rendering area with the description of the item 124. As non-limiting examples, the image rendering area may be situated above the description, below the description, alongside the description, or at some other position relative to the description of the item 124. A description of the item 124 may comprise, for example, a title, price, category, brand name, detailed description, and/or other textual information regarding an item 124.

One of the images 127 associated with the item 124 may be rendered initially in the image rendering area for the item 124. In one embodiment, the initially rendered image 127 may be downloaded synchronously with the network page 118, and the other images 127 of the item 124 may be obtained from the computing device 103 later. As a non-limiting example, the images 127 may be obtained from the computing device 103 by the client 106 as a combined image, where each of the images 127 comprises a portion of the combined image. The combined image may be referred to as a sprite. In other embodiments, the images 127 for an item 124 may be downloaded in advance or loaded on demand when rendered in the rendered network page 142.

Each of the image rendering areas in the rendered network page 142 may be divided by the image transition code 121 into a plurality of regions. The images 127 that are associated with an item 124 may each be mapped to a respective one of the regions of the image rendering area for the item 124. When a user at the client 106 moves a cursor, such as, for example, a mouse pointer, to enter or hover over one of the regions, the image rendering area may be updated such that the image 127 mapped to the region over which the cursor is hovered is rendered within the image rendering area.

When the user moves the cursor to enter another one of the regions of the image rendering area, the image rendering area may be updated again by the image transition code 121 to display the different image 127 associated with the different region. In one embodiment, when the user moves the cursor away from the image rendering area, the image rendering area may continue to display the last image 127 rendered in the image rendering area by the image transition code 121. In another embodiment, when the user moves the cursor away from the image rendering area, the image rendering area may display a default image 127, such as the image 127 that was initially rendered in the image rendering area. In yet another embodiment, when the user moves the cursor away from the image rendering area, different images 127 may be displayed within the image rendering area according to a rotating interval. The operation of the image transition code 121 will now be described in the context of examples of network pages 118 that are rendered in a browser 139.

Figure 2:
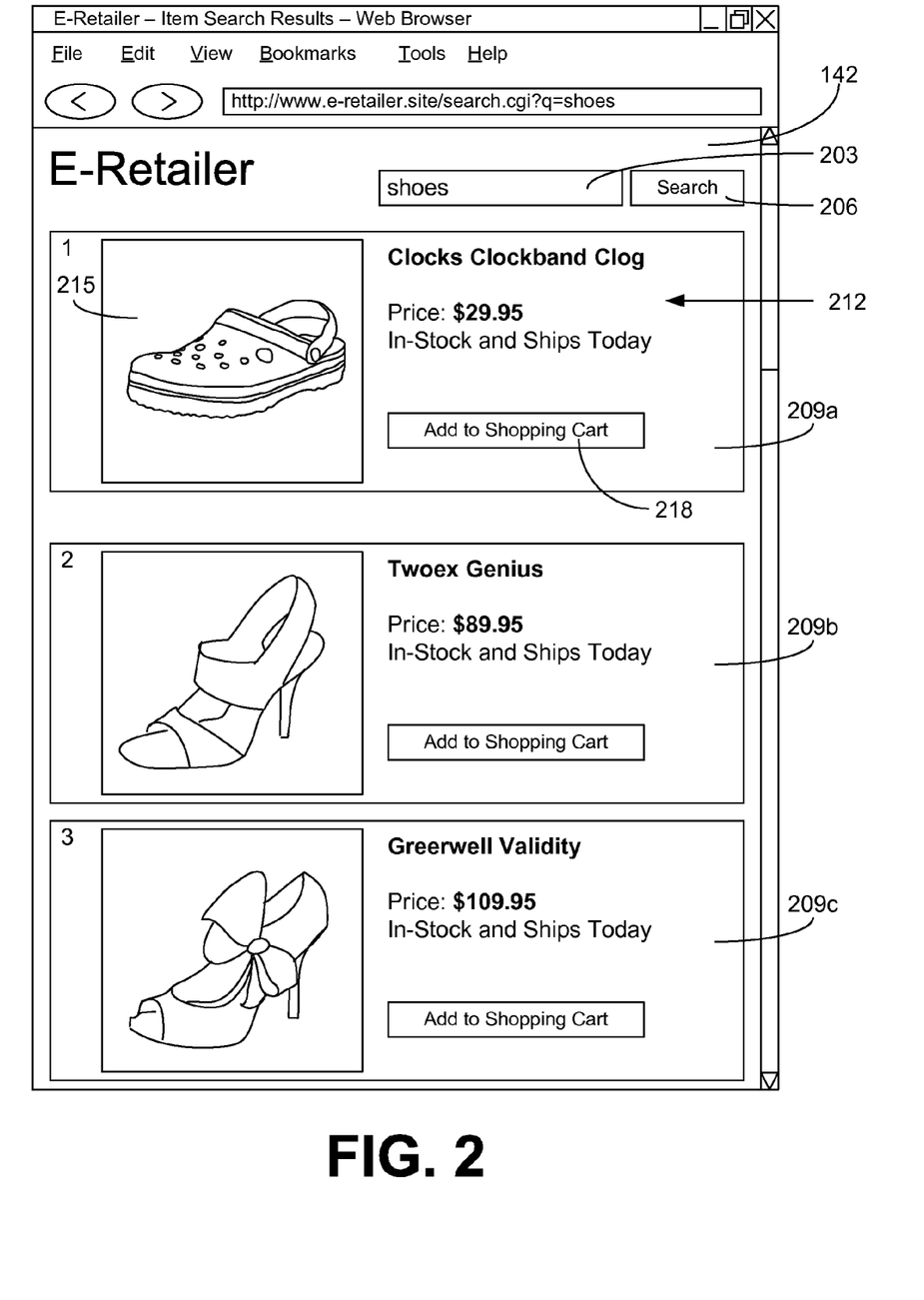
FIGS. 2-4 are drawings of examples of network pages rendered in a client in the networked environment of FIG. 1 according to various embodiments of the present disclosure.

Referring next to FIG. 2, shown is one example of a rendered network page 142 rendered by a browser 139 (FIG. 1) executing in a client 106 (FIG. 1) in the networked environment 100 (FIG. 1). The rendered network page 142 shown in FIG. 2 comprises a search result network page 118 (FIG. 1). However, it is understood that the rendered network page 142 may comprise any network page 118 that describes items 124 (FIG. 1), such as, for example, detail network pages 118, gateway network pages 118, category network pages 118, and/or other types of network pages 118. The example rendered network page 142 of FIG. 2 includes a search query component 203, a search execution component 206, and a plurality of search results 209a, 209b, and 209c. FIG. 2 illustrates the search results 209 resulting from a search query of "shoes" that has been entered in a search query component 203.

Each of the search results 209 describes a respective item 124. To this end, each of the search results 209 may include a corresponding item description 212, an image rendering area 215, and an add to shopping cart component 218. It is understood that other information and user interface components may be rendered in connection with a search result 209 in other embodiments. For example, in another embodiment, the search result 209 may be displayed in conjunction with a component for initiating a purchase of the associated item 124. Although depicted as buttons, the search execution component 206 and the add to shopping cart component 218 may comprise links, selectable images, and/or other user interface components as desired in other embodiments.

The image rendering area 215 for the search result 209*a* depicts an image 127 (FIG. 1) of the associated item 124 that is displayed when the network page 118 is initially rendered as the rendered network page 142. This initial image 127 may be obtained, for example, along with the network page 118 from the network page generation application 115 (FIG. 1). In one embodiment, the image rendering area 215 and initial image 127 may be configured such that the initial image 127 fills the image rendering area 215 in one or more dimensions. For example, the initial image 127 may have the same height and/or width as the image rendering area 215.

Figure 3:
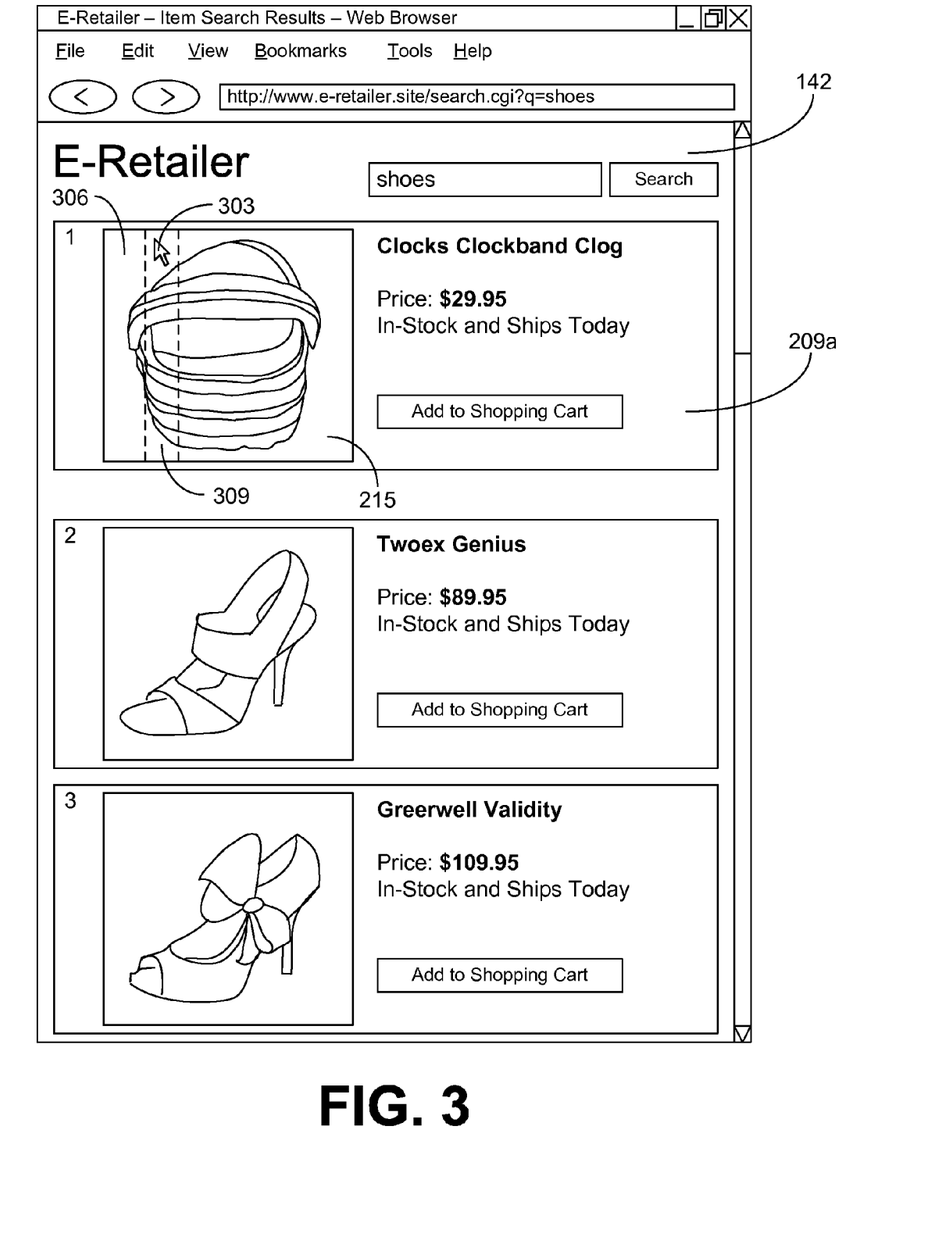

Turning now to FIG. 3, shown is another example of a rendered network page 142 rendered by a browser 139 (FIG. 1) executing in a client 106 (FIG. 1) in the networked environment 100 (FIG. 1). In the rendered network page 142 shown in FIG. 3, a user has moved a cursor 303 from a first region 306 to a second region 309 of the image rendering area 215 associated with the item 124 (FIG. 1) titled "Clocks Clockband Clog." When the cursor 303 was moved from the first region 306 to the second region 309, the image transition code 121 (FIG. 1) replaced the image 127 (FIG. 2) depicted in the image rendering area 215 shown in FIG. 2 with the image 127 depicted in the image rendering area 215 in FIG. 3. The image 127 shown in FIG. 3 depicts a different view of the item 124 described by the search result 209*a*. Although the second region 309 is depicted with a border demarcation surrounding the second region 309, it is understood that in other embodiments the active region 309 may not be graphically demarcated at least initially.

Figure 4:
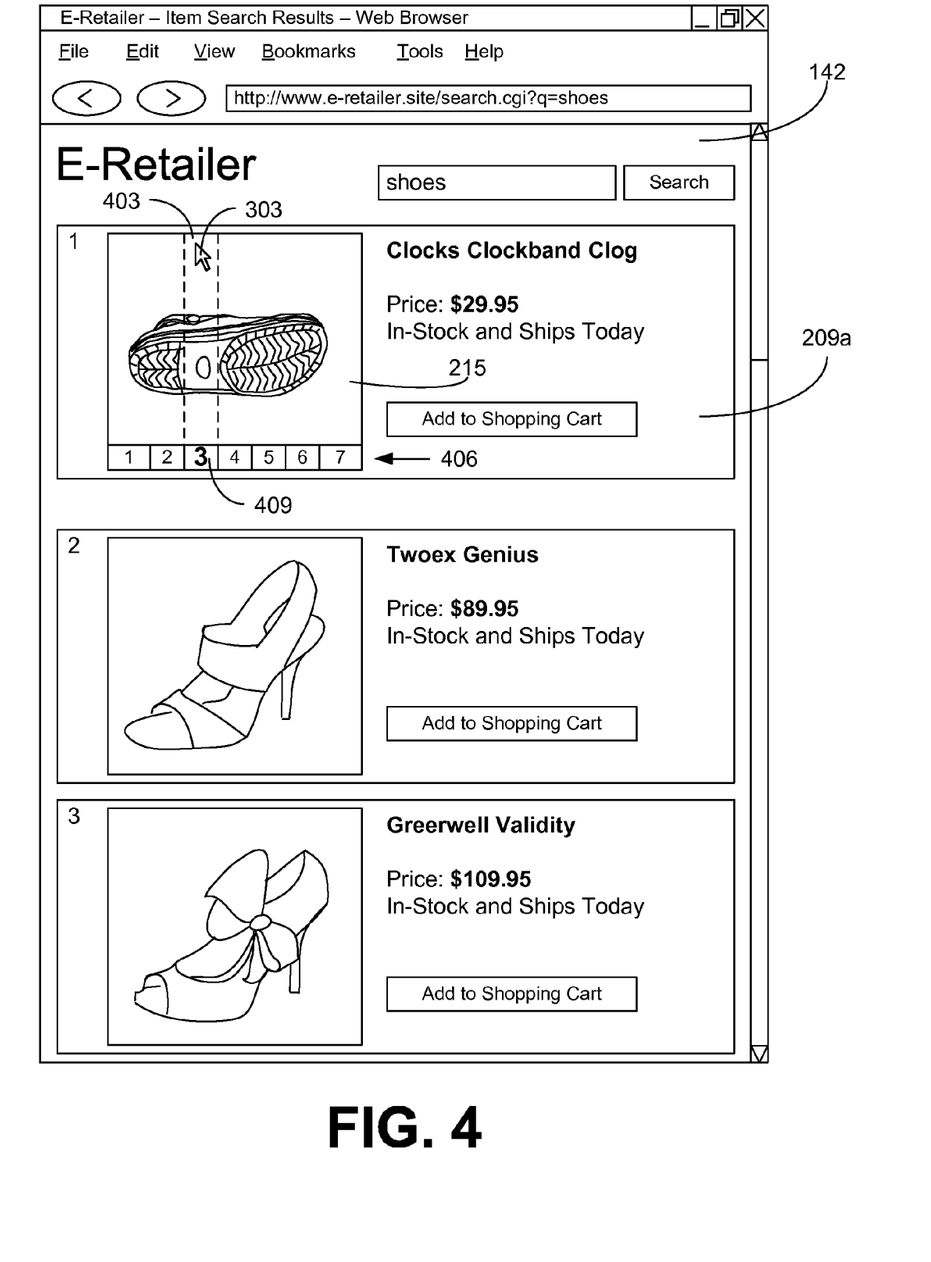

Moving on to FIG. 4, shown is another example of a rendered network page 142 rendered by a browser 139 (FIG. 1) executing in a client 106 (FIG. 1) in the networked environment 100. In this example, the cursor 303 is hovering over a third region 403 of the image rendering area 215. Accordingly, another one of the images 127 (FIG. 1) associated with the item 124 described by the search result 209*a* is illustrated in the image rendering area 215.

Additionally, a legend 406 is shown adjacent to the image rendering area 215. In various embodiments, the term "adjacent" may refer to the legend 406 being proximate to the image rendering area 215 so as to promote a visual association of the image rendering area 215 with the legend 406. As non-limiting examples, the legend 406 may be situated above the image rendering area 215, below the image rendering area 215, alongside the image rendering area 215, or at some other position relative to the image rendering area 215.

The legend 406 is configured to label or indicate the location of the various regions of the image rendering area 215. Furthermore, the legend 406 may be configured to graphically indicate by way of an indicator 409 which of the regions is currently selected by the cursor 303. As non-limiting examples, a number or other indicium corresponding to a region may be emphasized by highlighting, bolding, color changes, size changes, etc. Also, borders, hatch marks, shading, color changes, and/or other type of graphical demarcations may be employed to indicate a selected region and/or unselected regions of the image rendering area 215. In the example of FIG. 4, the legend 406 indicates that the image rendering area 215 is divided into seven regions along a horizontal axis. Thus, the seven regions may be mapped to seven corresponding images 127 that are associated with the item 124 described by the search result 209*a*. In other embodiments, a legend 406 may be displayed in other locations near or adjacent to the image rendering area 215.

Figure 5:
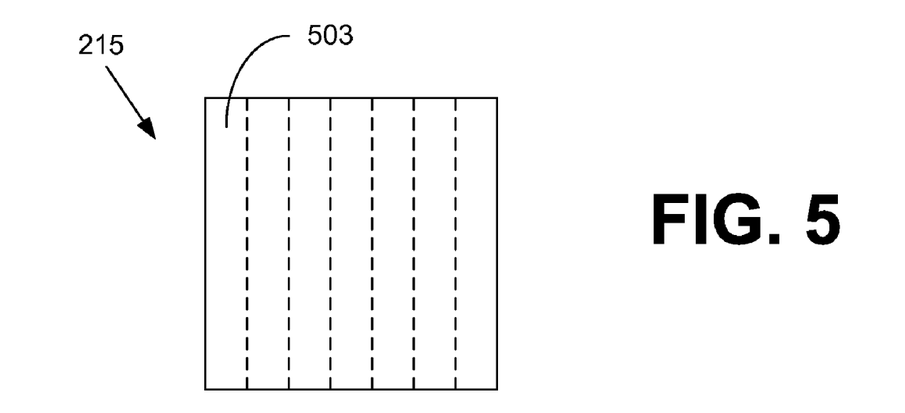
FIGS. 5-8 illustrate examples of partitioning an image rendering area employed within a network page rendered in a client in the networked environment of FIG. 1 according to various embodiments of the present disclosure.

Referring next to FIG. 5, shown is one example of an image rendering area 215 from a rendered network page 142 (FIG. 1). The image rendering area 215 depicted in FIG. 5 is divided into a plurality of vertical regions 503. Each of the vertical regions 503 may be mapped to a corresponding image 127 (FIG. 1) associated with an item 124 (FIG. 1). Although the vertical regions 503 are depicted as having equal widths, it is understood that in other embodiments the vertical regions 503 may have different widths. The vertical regions 503 represent divisions along the horizontal axis of the image rendering area 215.

Figure 6:
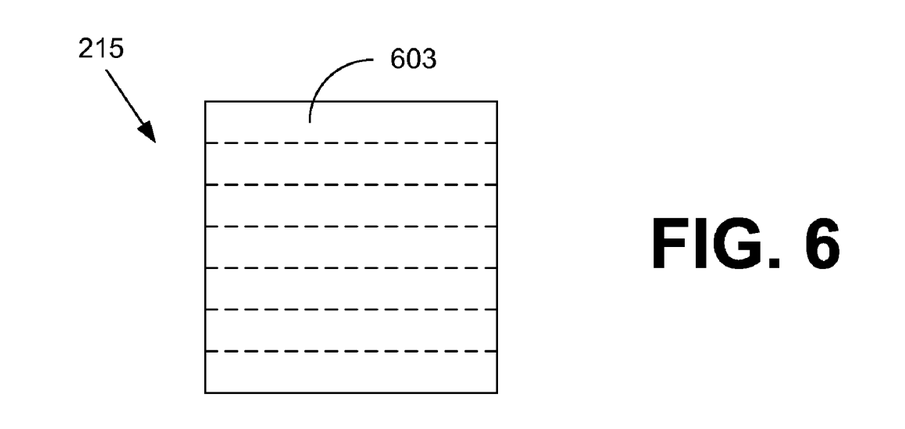

Turning now to FIG. 6, shown is another example of an image rendering area 215 from a rendered network page 142 (FIG. 1). The image rendering area 215 depicted in FIG. 6 has been divided into a plurality of horizontal regions 603. Each of the horizontal regions 603 may be mapped to a corresponding image 127 (FIG. 1) associated with an item 124 (FIG. 1). Although the horizontal regions 603 are shown as having the same height, it is understood that the horizontal regions 603 may have different heights in other embodiments. The horizontal regions 603 may be regarded as divisions along a vertical axis of the image rendering area 215.

Figure 7:
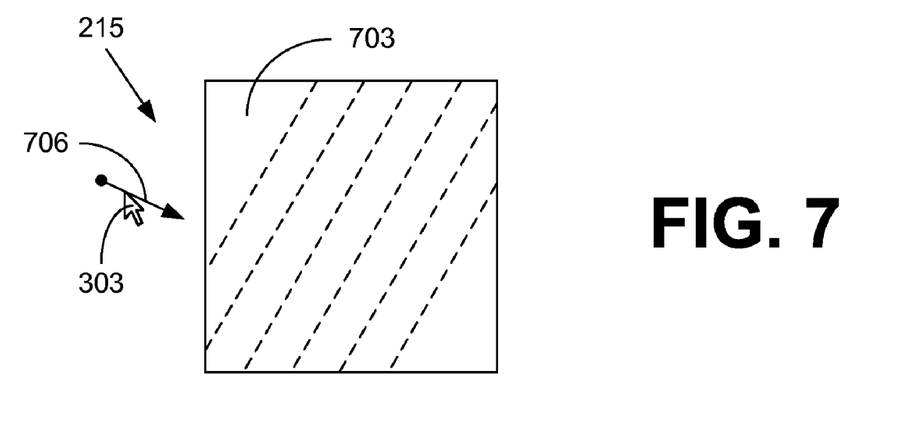

Moving on to FIG. 7, shown is another example of an image rendering area 215 from a rendered network page 142 (FIG. 1). The image rendering area 215 has been divided into a plurality of regions 703. Each of the regions 703 is mapped to a corresponding one of the images 127 (FIG. 1) that are associated with an item 124 (FIG. 1). The axis used in dividing the image rendering area 215 into the regions 703 may be determined, for example, according to a movement of the cursor 303 that defines a vector 706. The vector 706 may be used in determining an axis relative to the angle of the vector 706 in one embodiment. In one embodiment, the magnitude of the vector 706 may be used in determining the divisions of the regions 703 along the axis. As non-limiting examples, the magnitude of the vector 706 may affect the quantity of regions 703, the widths of the regions 703, and/or other characteristics of the regions 703.

Figure 8:
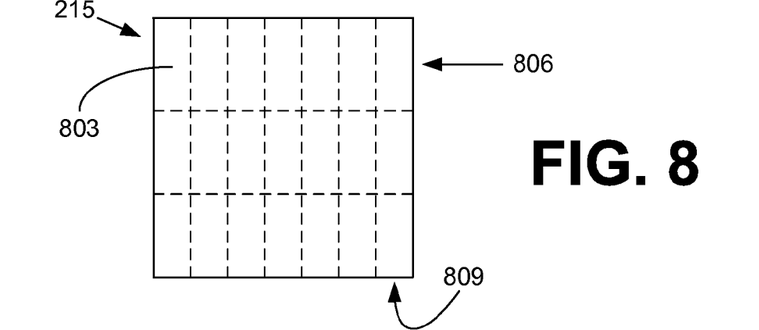

With reference to FIG. 8, shown is another example of an image rendering area 215. The image rendering area 215 has been divided into a plurality of regions 803 along a first axis 806 and a second axis 809. Each of the regions 803 appear as a division of a grid established by the first axis 806 and the second axis 809. In one embodiment, the divisions along the first axis 806 may select a particular type of view of an item 124 (FIG. 1), while divisions along the second axis 809 may select options associated with each respective view of the item 124.

As a non-limiting example, the different views of the item 124 may correspond to images 127 (FIG. 1) of the item 124 taken at different angles. The options indicated by the divisions along the second axis 809 may correspond to colors or other features associated with the item 124. For example, in the case of an item 124 that comprises a shoe, the divisions along the first axis 806 may represent a front view of the shoe, a side view of the shoe, a rear view of the shoe, a top view of the shoe, a bottom view of the shoe, etc. Similarly, the divisions along the second axis 809 may represent different colors of the shoe such as, white, black, green, blue, etc. Although the number of regions 803 along the first axis 806 may equal the number of regions 803 formed along the second axis 809, such equivalence is not required.

Figure 9:
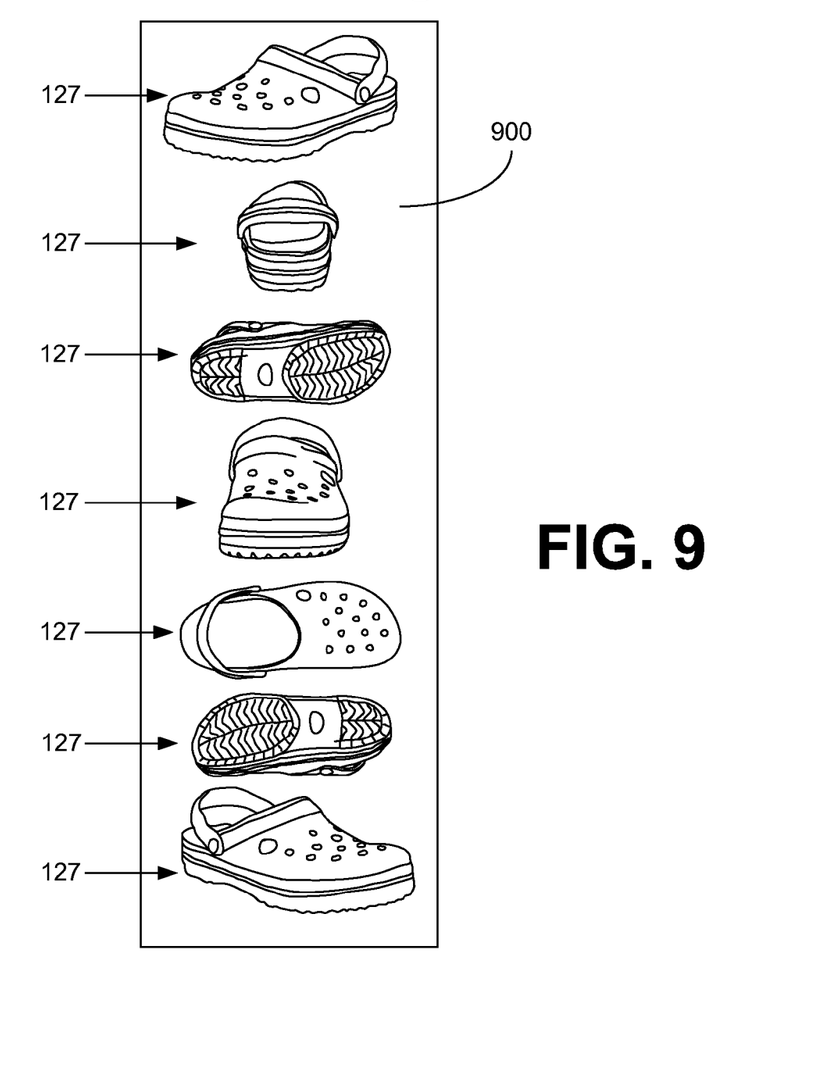
FIG. 9 depicts an example of a combined image that includes a plurality of images of an item that may be employed within a network page rendered in a client in the networked environment of FIG. 1 according to one embodiment of the present disclosure.

Turning now to FIG. 9, shown is one example of a combined image 900 that may be used in rendering images 127 within an image rendering area 215 (FIG. 2). The combined image 900, which may be called a "sprite," may be used to reduce the number of files transmitted from the computing device 103 (FIG. 1) to the client 106 (FIG. 1). When an image 127 is rendered within an image rendering area 215, the image transition code 121 (FIG. 1) may be configured to make visible a portion of the combined image 900 corresponding to the desired image 127. Although the combined image 900 is shown having a vertical alignment of the images 127, it is understood that any alignment of the images 127 may be employed in the combined image 900. As non-limiting examples, a horizontal alignment, a grid alignment, a circular alignment, a spiral alignment, or another type of alignment may be used instead.

In one embodiment, the combined image 900 may be preloaded by the image transition code 121 when a user expresses an interest in an item 124 represented by a search result 209 (FIG. 2) or other description of an item 124. It may be determined that a user is expressing an interest in an item 124 by various ways. For example, a user may hover a cursor 303 (FIG. 3) over a portion of a description associated with an item 124, which may be considered as expressing an interest. As another example, a user may begin hovering the cursor 303 over a portion of the image rendering area 215, which may also be considered as expressing an interest. As yet another example, a description of the item 124 may be present within the screen of the rendered network page 142 (FIG. 1) shown in a viewport of a browser 139 (FIG. 1) beyond a certain duration, which may also be interpreted as expressing an interest.

It is understood that a user may express an interest in an item 124 in many ways beyond those described herein. Although the example of a combined image 900 is discussed, separate files for one or more of the images 127 may be used in other embodiments. In one embodiment, a file for an initial image 127 that is configured to be initially rendered in the image rendering area 215 may be sent separately from the combined image 900. The combined image 900 may or may not include the initial image 127 in such an embodiment.

Figure 10:
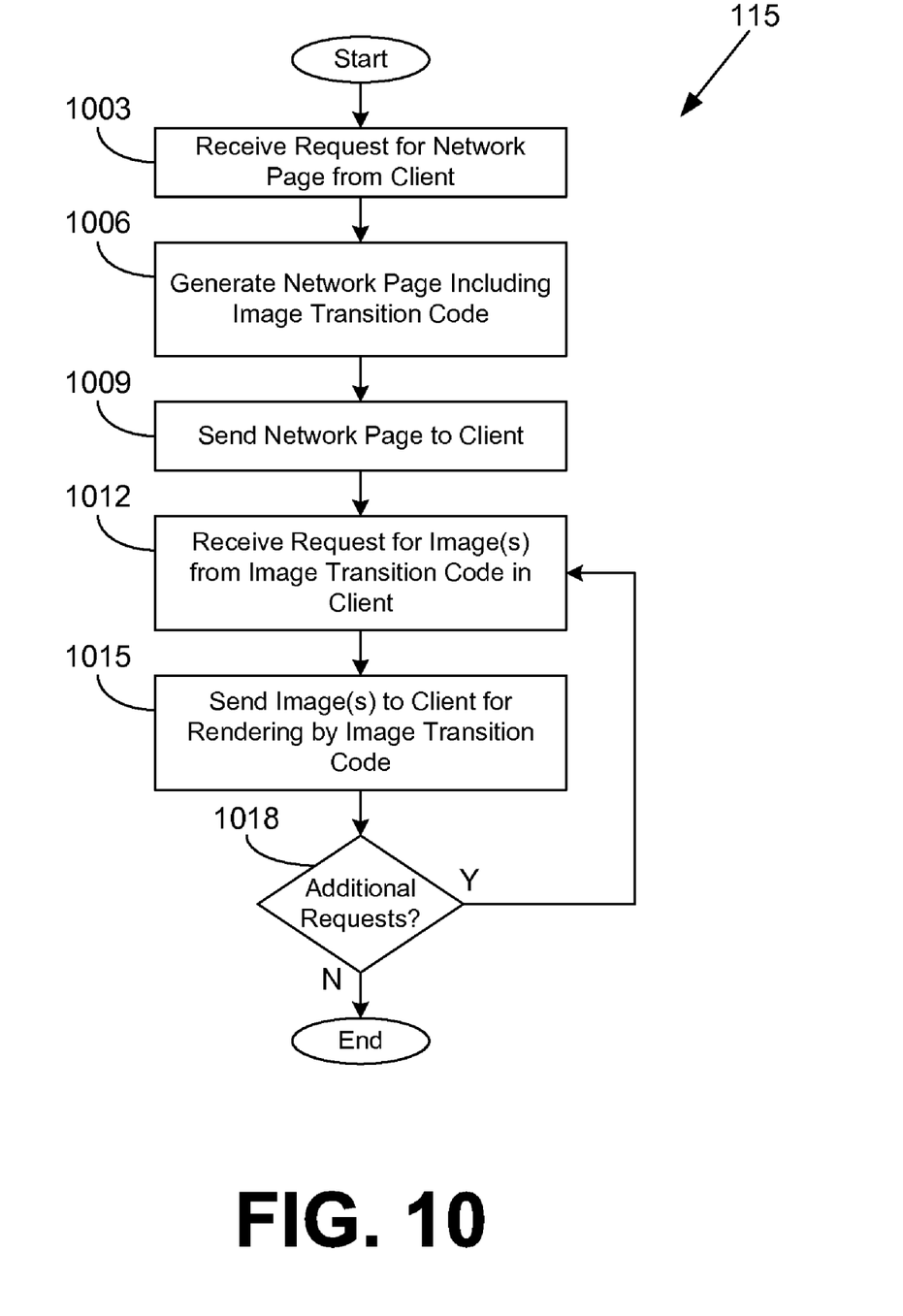
FIG. 10 is a flowchart illustrating one example of functionality implemented as portions of a network page generation application executed in a computing device in the networked environment of FIG. 1 according to various embodiments of the present disclosure.

Referring next to FIG. 10, shown is a flowchart that provides one example of the operation of a portion of the network page generation application 115 according to various embodiments. It is understood that the flowchart of FIG. 10 provides merely an example of the many different types of functional arrangements that may be employed to implement the operation of the portion of the network page generation application 115 as described herein. As an alternative, the flowchart of FIG. 10 may be viewed as depicting an example of steps of a method implemented in the computing device 103 (FIG. 1) according to one or more embodiments.

Beginning with box 1003, the network page generation application 115 receives a request for a network page 118 (FIG. 1) from a client 106 (FIG. 1) over the network 109 (FIG. 1). In box 1006, the network page generation application 115 generates a network page 118 (FIG. 1) describing one or more items 124 (FIG. 1) and including image transition code 121 (FIG. 1). The image transition code 121 may be generated from the image transition code 133 (FIG. 1) stored in the data store 112 (FIG. 1). Thereafter, in box 1009, the network page generation application 115 sends the network page 118 to the client 106.

Next, in box 1012, the network page generation application 115 receives a request for one or more images 127 (FIG. 1) from the image transition code 121 executing in the client 106. In response, in box 1015, the network page generation application 115 sends the requested one or more images 127 to the client 106 for rendering by the image transition code 121. The one or more images 127 may be sent to the client 106 as a combined image 900 (FIG. 9) in one embodiment.

In box 1018, the network page generation application 115 determines whether an additional request for an image 127 is pending. For example, a user may be expressing an interest in an item 124 for which not all images 127 have been sent to the client 106. The image transition code 121 may be configured to request one or more of the non-loaded images 127 from the network page generation application 115. If an additional request for an image 127 is pending, the network page generation application 115 returns to box 1012. Otherwise, the portion of the network page generation application 115 ends.

Figure 11:
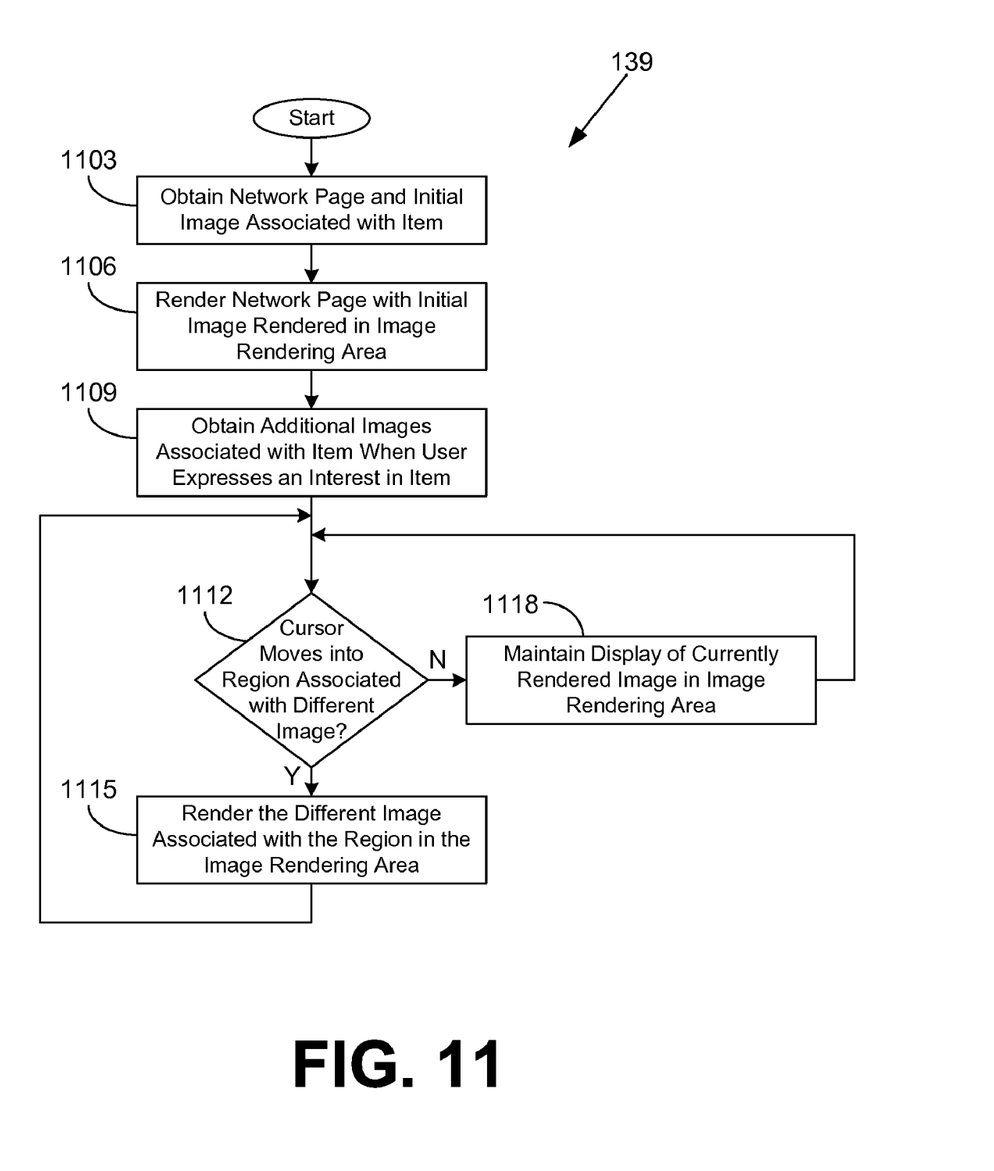
FIG. 11 is a flowchart illustrating one example of functionality implemented as portions of a browser that is executing image transition code in a client in the networked environment of FIG. 1 according to various embodiments of the present disclosure.

Turning now to FIG. 11, shown is a flowchart that provides one example of the operation of a portion of the browser 139 that is executing the image transition code 121 (FIG. 1) according to various embodiments. It is understood that the flowchart of FIG. 11 provides merely an example of the many different types of functional arrangements that may be employed to implement the operation of the portion of the browser 139 and the image transition code 121 as described herein. As an alternative, the flowchart of FIG. 11 may be viewed as depicting an example of steps of a method implemented in the client 106 (FIG. 1) according to one or more embodiments.

Beginning with box 1103, the browser 139 obtains the network page 118 (FIG. 1) and an initial image 127 (FIG. 1) associated with an item 124 (FIG. 1). In box 1106, the browser 139 renders the network page 118 with the initial image 127 shown in the image rendering area 215 (FIG. 2). Subsequently, in box 1109, the image transition code 121 executing in the browser 139 may obtain additional images 127 associated with the item 124 when the user at the client 106 expresses an interest in the item 124. Such images 127 may be preloaded in a combined image 900 (FIG. 9) in some embodiments.

In box 1112, the image transition code 121 executing in the browser 139 determines whether a cursor 303 (FIG. 3) has moved into a region of the image rendering area 215 that is associated with a different image 127 than the image 127 that is currently rendered. In various embodiments, the image transition code 121 may continuously receive coordinates of the cursor 303 and compare the coordinates with the region boundaries. If the image transition code 121 determines that the cursor 303 has moved into a region associated with a different image 127, then in box 1115 the image transition code 121 renders the different image 127 associated with the region in the image rendering area 215. The image transition code 121 may then return to box 1112 and determine whether the cursor 303 has moved into another region while the browser 139 is displaying the rendered network page 142 (FIG. 1). The image transition code 121 may continue in a loop until ended by the browser 139 navigating to another network page.

If the image transition code 121 determines that the cursor 303 has not moved into a region associated with a different image 127, the image transition code 121 moves to box 1118 and maintains the display of the currently rendered image 127 in the image rendering area 215. In one embodiment, the image transition code 121 may display a default image 127 in the image rendering area 215 if the cursor 303 moves outside of the image rendering area 215. Alternatively, the image transition code 121 may continue to display the last image 127. Thereafter, the image transition code 121 may return to box 1112 and determine whether the cursor 303 has moved into another region while the browser 139 is displaying the rendered network page 142. The image transition code 121 may continue in a loop until ended by the browser 139 navigating to another network page.

Figure 12:
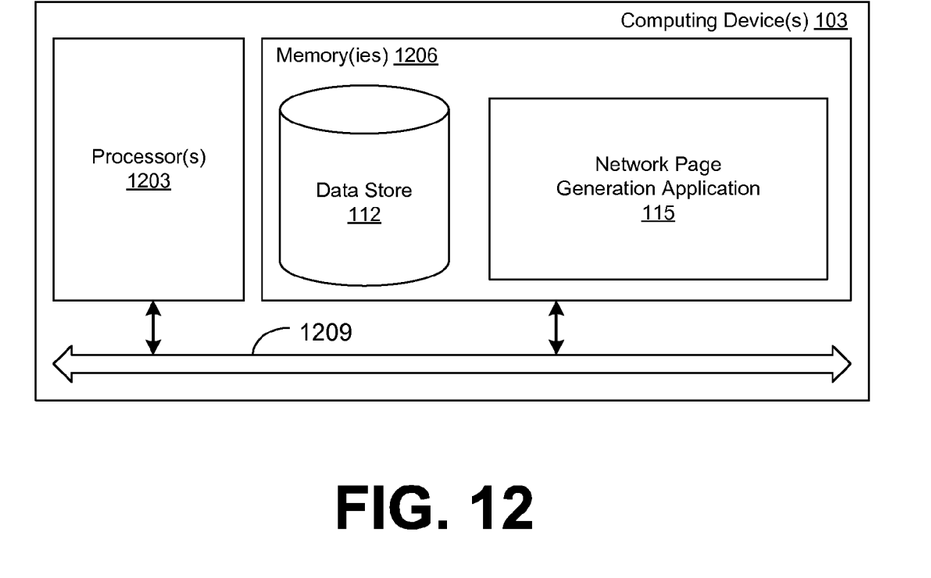
FIG. 12 is a schematic block diagram that provides one example illustration of a computing device employed in the networked environment of FIG. 1 according to various embodiments of the present disclosure.

With reference to FIG. 12, shown is a schematic block diagram of the computing device 103 according to an embodiment of the present disclosure. The computing device 103 includes at least one processor circuit, for example, having a processor 1203 and a memory 1206, both of which are coupled to a local interface 1209. To this end, the computing device 103 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are network page generation application 115 and potentially other applications. Also stored in the memory 1206 may be a data store 112 and other data. In addition, an operating system may be stored in the memory 1206 and executable by the processor 1203.

It is understood that there may be other applications that are stored in the memory 1206 and are executable by the processors 1203 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and the memory 1206 may represent multiple memories 1206 that operate in parallel processing circuits, respectively. In such a case, the local interface 1209 may be an appropriate network 109 (FIG. 1) that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the network page generation application 115, the image transition code 121 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 10 and 11 show the functionality and operation of an implementation of portions of the network page generation application 115 and the image transition code 121 executing in a browser 139 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the flowcharts of FIGS. 10 and 11 show a specific order of execution, it is understood that the order of execution may differ from that which is depicted. For example, the order of execution of two or more blocks may be scrambled relative to the order shown. Also, two or more blocks shown in succession in FIGS. 10 and 11 may be executed concurrently or with partial concurrence. Further, in some embodiments, one or more of the blocks shown in FIGS. 10 and 11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation application 115 and the image transition code 121, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that generates a network page describing a product and including an image rendering area for rendering a first one of a plurality of images depicting the product, the image rendering area being divided along a first axis and a second axis into a plurality of regions that are at least initially undemarcated graphically, each of the images being mapped to a respective one of the regions;
   wherein the network page includes code that renders the first one of the images in the image rendering area when the network page is initially rendered in a client, the first one of the images filling the image rendering area in at least one dimension;
   wherein the network page further includes code that replaces the first one of the images with a second one of the images when a cursor hovers over the respective one of the regions that is mapped to the second one of the images; and
   wherein the first axis determines one of a plurality of views of the product and the second axis determines one of a plurality of options associated with the product, and each of the images depicts a corresponding one of the options being applied to a corresponding one of the views of the product.

2. A system, comprising:
   at least one computing device; and
   a network page generation application executable in the at least one computing device, the network page generation application comprising:
      logic that generates a network page describing an item and including an image rendering area for rendering a first one of a plurality of images associated with the item, the image rendering area being divided into a plurality of regions, each of the images being mapped to a respective one of the regions, the network page including code that replaces the first one of the images with a second one of the images when a cursor hovers over the respective one of the regions that is mapped to the second one of the images;
      wherein the regions comprise a plurality of divisions of the image rendering area along a first axis and a second axis; and
      wherein the first axis determines one of a plurality of views of the item and the second axis determines one of a plurality of options associated with the item, and each of the images depicts a corresponding one of the options being applied to a corresponding one of the views of the item.

3. The system of claim 2, wherein the network page further includes code that replaces a currently rendered one of the images with a third one of the images when the cursor hovers over the respective one of the regions that is mapped to the third one of the images.

4. The system of claim 2, wherein the network page further includes a legend adjacent to the image rendering area that labels each one of the regions.

5. The system of claim 2, wherein the image rendering area is adjacent to a description of the item.

6. The system of claim 2, wherein the network page further includes code that renders the first one of the images in the image rendering area when the network page is initially rendered, the first one of the images thereby filling the image rendering area in at least one dimension.

7. The system of claim 2, wherein the item comprises a product, and each of the images depicts a different view of the product.

8. The system of claim 2, wherein the network page further includes code that obtains the images from the at least one computing device when a user indicates an interest in the item.

9. The system of claim 2, wherein each of the images comprises a respective portion of a combined image.

10. The system of claim 2, wherein the regions of the image rendering area are at least initially undemarcated graphically.

11. The system of claim 10, wherein the network page further includes code that makes a border around the respective one of the regions visible when the cursor hovers over the respective one of the regions.

12. The system of claim 2, wherein the network page further includes code that determines the first axis based at least in part on a movement of the cursor.

13. The system of claim 2, wherein the options comprise item colors.

14. The system of claim 2, wherein the network page further includes code that maintains a display of a currently rendered one of the images when the cursor moves outside of the image rendering area.

15. The system of claim 2, wherein the network page describes a plurality of items, and the item is one of the items.

16. The system of claim 15, wherein the network page comprises a search result network page, and the items correspond to search results.

17. A method, comprising the steps of:
   obtaining, in a client computing device, a network page that describes an item and a plurality of images that are associated with the item;

rendering, in the client computing device, the network page, wherein a first one of the images is initially rendered in an image rendering area adjacent to a description of the item on the network page, the image rendering area is divided into a plurality of regions, and each one of the regions is mapped to a respective one of the images;

determining, in the client computing device, that a cursor has moved within the one of the regions that is mapped to the second one of the images;

rendering, in the client computing device, a second one of the images in place of the first one of the images in the image rendering area when the cursor is hovering over the one of the regions that is mapped to the second one of the images;

wherein the regions comprise a plurality of divisions of the image rendering area along a first axis and a second axis; and wherein the first axis determines one of a plurality of views of the item and the second axis determines one of a plurality of options associated with the item, and each of the images depicts a corresponding one of the options being applied to a corresponding one of the views of the item.

18. The method of claim 17, wherein the obtaining step further comprises the step of obtaining, in the client computing device, a combined image that includes at least the ones of the images other than the first one of the images when a user expresses an interest in the item.

19. The method of claim 18, wherein the user expresses the interest in the item by hovering the cursor over a display region of the network page associated with the item.

20. The method of claim 17, wherein the obtaining step further comprises the step of obtaining, in the client computing device, at least one of the images from a server after the network page is rendered.

21. The method of claim 17, further comprising the step of rendering, in the client computing device, the first one of the images when the cursor is hovering over the one of the regions that is mapped to the first one of the images.

22. The method of claim 17, further comprising the step of maintaining, in the client computing device, a display of a currently rendered one of the images when the cursor moves outside of the image rendering area.

23. The method of claim 17, wherein the first one of the images fills the image rendering area in at least one dimension when the first one of the images is rendered in the image rendering area.

24. The method of claim 17, wherein the network page describes a plurality of items, and the item is one of the items.

25. The method of claim 24, wherein the network page comprises a search result network page, and the items correspond to search results.

* * * * *